(12) United States Patent
Kariatsumari

(10) Patent No.: US 6,305,489 B1
(45) Date of Patent: Oct. 23, 2001

(54) POWER STEERING APPARATUS

(75) Inventor: Yuji Kariatsumari, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/431,186

(22) Filed: Nov. 1, 1999

(30) Foreign Application Priority Data

Nov. 10, 1998 (JP) .................................................. 10-319529

(51) Int. Cl.$^7$ .................................................. B62D 5/06
(52) U.S. Cl. .................................................. 180/422
(58) Field of Search .................... 701/41; 180/421, 180/422, 423, 446

(56) References Cited

U.S. PATENT DOCUMENTS

| | | | |
|---|---|---|---|
| 4,762,194 | * 8/1988 | Morishita et al. | 180/79.1 |
| 5,381,336 | * 1/1995 | Shorkey | 701/41 |
| 5,558,177 | * 9/1996 | Inaguma et al. | 180/422 |
| 5,691,900 | * 11/1997 | Luckevich | 701/41 |
| 6,131,693 | * 10/2000 | Mukai et al. | 180/446 |

* cited by examiner

Primary Examiner—Brian L. Johnson
Assistant Examiner—Avraham H. Lerner
(74) Attorney, Agent, or Firm—Rabin & Champagne, P.C.

(57) ABSTRACT

A power steering apparatus senses a fore-and-aft acceleration of a vehicle which is expressed as a value prefixed with a sign, and a rotation speed Ri of an electric motor is reduced to reduce an assist force in accordance with the acceleration if the value of the sensed vehicle acceleration is positive, and increased to increase the assist force in accordance with the acceleration if the value of the sensed vehicle acceleration is negative (FIG. 4). With this control operation, a consistent steering feeling can be provided even at acceleration or deceleration of the vehicle.

1 Claim, 4 Drawing Sheets

POWER STEERING APPARATUS

This application is based on patent application Ser. No. 10-319529 filed in Japan, the content of which is incorporated thereinto by reference.

TECHNICAL FIELD

The present invention relates to a power steering apparatus and, more particularly, to a so-called motor-driven hydraulic power steering apparatus which is adapted to generate a hydraulic pressure by driving an oil pump by an electric motor to assist a steering operation by the generated hydraulic pressure.

BACKGROUND ART

Motor-driven hydraulic power steering apparatuses are conventionally known which are adapted to rotate an oil pump by an electric motor and supply a working oil to a power cylinder from the oil pump to mitigate an operation force required for operating a steering wheel.

In a power steering apparatus of this type, a steering assist force is determined by the rotation speed of the electric motor. More specifically, a higher rotation speed of the electric motor increases the flow rate of the oil to increase the assist force, while a lower rotation speed of the electric motor reduces the flow rate of the oil to reduce the assist force.

On the other hand, the assist force is not required when the steering operation is not performed and, therefore, the rotation of the electric motor is stopped or kept in an idling state with an extremely low rotation speed for power saving.

Since loads on front wheels are apparently increased immediately after a vehicle is decelerated by pedaling a break just before a corner, the steering wheel tends to feel heavier. Immediately after the vehicle is accelerated, the loads on the front wheels are apparently reduced, so that the steering wheel tends to feel lighter. With the assist force being maintained at a constant level, the steering feeling changes at the acceleration and deceleration of the vehicle, so that the driver feels uncomfortable.

When the steering operation is suddenly started in a non-steering state, the rotation of the electric motor cannot follow the sudden start of the steering operation, so that the steering wheel temporarily feels heavier. Therefore, it is desirable that the rotation speed of the electric motor is steeply increased by predicting occurrence of the steering operation.

DISCLOSURE OF THE INVENTION

It is an object of the present invention to provide a power steering apparatus which ensures a consistent steering feeling even at acceleration and deceleration of a vehicle.

It is another object of the present invention to provide a power steering apparatus which constantly provides a consistent steering feeling by predicting occurrence of a steering operation.

In accordance with one aspect of present invention to achieve the aforesaid objects, there is provided a power steering apparatus which comprises: acceleration detection means for sensing a fore-and-aft acceleration of a motor vehicle which is expressed as a value prefixed with a sign; and control means for reducing a rotation speed of an electric motor to reduce an assist force in accordance with the acceleration if the value of the acceleration of the vehicle sensed by the acceleration detection means is positive, and increasing the rotation speed of the electric motor to increase the assist force in accordance with the acceleration if the value of the acceleration of the vehicle sensed by the acceleration detection means is negative.

The power steering apparatus allows a driver to constantly obtain a consistent steering feeling irrespective of the fore-and-aft acceleration.

In accordance with another aspect of the invention, there is provided a power steering apparatus which comprises: acceleration detection means for sensing a fore-and-aft acceleration of a motor vehicle which is expressed as a value prefixed with a sign; and control means for preliminarily setting a rotation speed of an electric motor at a rotation speed level sufficient for generation of an assist force in accordance with the acceleration if the value of the acceleration of the vehicle sensed by the acceleration detection means is not greater than a predetermined negative level when a steering operation is not performed.

In the power steering apparatus, the next occurrence of the steering operation can be predicted by detecting an acceleration level not greater than the predetermined negative level and, therefore, the assist force can smoothly be generated immediately after the steering operation is started. The aforesaid "predetermined negative level" is defined as a fore-and-aft acceleration level of the vehicle typically sensed when the driver consciously decelerates the vehicle before performing the steering operation. The aforesaid "rotation speed level sufficient for generation of an assist force" is defined as a rotation speed level required for generation of a force sufficient to assist the steering operation performed by the driver.

BRIEF DESCRIPTION OF THE DRAWINGS

FIG. 2 is a diagram illustrating electrical interconnection of an electronic control unit ECU and the like;

BEST MODE FOR IMPLEMENTATION OF THE INVENTION

Embodiments of the present invention will hereinafter be described in detail with reference to the attached drawings.

Figure 1:
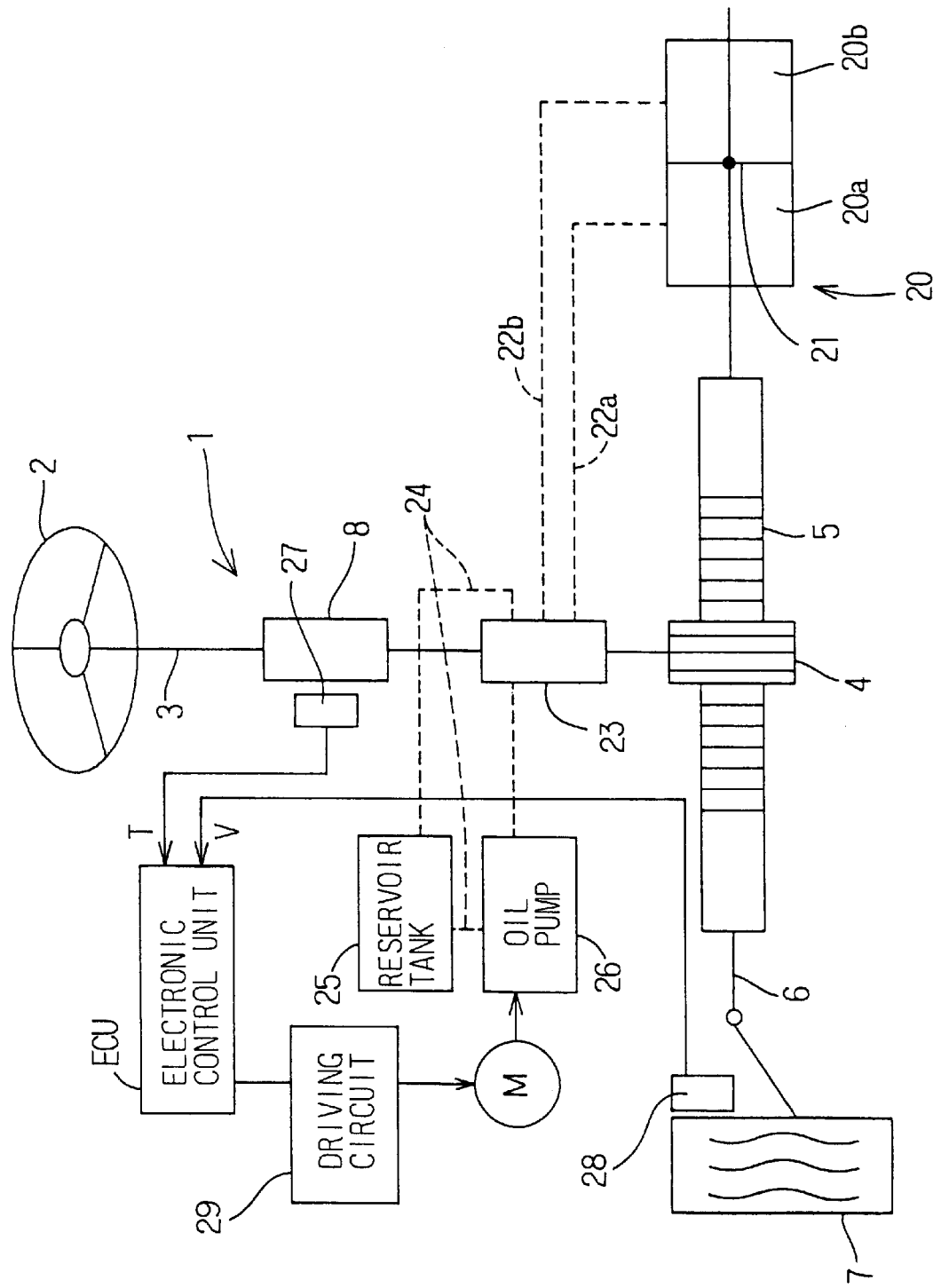
FIG. 1 is a schematic diagram illustrating the overall construction of a power steering apparatus according to one embodiment of the present invention.

FIG. 1 is a schematic diagram illustrating the overall construction of a power steering apparatus according to one embodiment of the present invention. The power steering apparatus is incorporated in a motor vehicle and adapted to assist a steering operation of a steering mechanism 1.

The steering mechanism 1 includes a steering wheel 2. A steering shaft 3 is coupled to the steering wheel 2, and a pinion gear 4 is attached to the distal end of the steering shaft 3. The pinion gear 4 is meshed with a rack gear 5 which extends transversely of the vehicle. Front tires 7 are attached to the rack gear 5 via tie rods 6.

When the steering wheel 2 is operated and a torque applied thereto is transmitted to the steering shaft 3, the pinion gear 4 provided at the distal end of the steering shaft is rotated, so that the rack gear 5 is moved transversely of the vehicle. As a result, the movement of the rack gear 5 is transmitted to the tie rods 6 to change the orientation of the front tires 7.

The power steering apparatus further includes a power cylinder 20 for generating a steering assist force. The power cylinder 20 includes a piston 21 coupled to the rack shaft 5, and a pair of cylinder chambers 20a, 20b split by the piston 21. A hydraulic pressure control valve 23 is connected to the cylinder chambers 20a, 20b via oil supply lines 22a, 22b indicated by broken lines.

The hydraulic pressure control valve 23 is interposed in an oil circulation line 24 indicated by a broken line. Through the oil circulation line 24, a working oil contained in a reservoir tank 25 is pumped up by an oil pump 26, then discharged from the oil pump 26, and returned into the reservoir tank 25.

The oil pump 26 is driven and controlled by an electric motor M. When the oil pump 26 is driven by the electric motor M, the working oil is circulated through the oil circulation line 24. With the oil pump being off, the circulation of the working oil is suspended.

A torque sensor 27 is provided in association with a torsion bar 8 attached to the steering shaft 3, and outputs a torque signal having a value proportional to the magnitude of a torque applied to the steering shaft 3 and a sign corresponding to the direction of the torque. A torque sensor of any type such as a potentiometer having a mechanical contact or a non-contact torque sensor may be employed as the torque sensor 27.

The hydraulic pressure control valve 23 is adapted to change its valve aperture in accordance with the direction and magnitude of the torque applied to the steering shaft 3, which are sensed by the torque sensor 27. Thus, the supply of the working oil to the power cylinder 20 can be varied.

When the working oil is supplied to either of the cylinder chambers of the power cylinder 20, the piston 21 is moved in a corresponding direction transversely of the vehicle. Thus, a steering force is generated to assist the movement of the rack shaft 5.

A vehicle speed sensor 28 is provided for sensing the rotation speed of a rotor of a wheel. Usable as the vehicle speed sensor is a magnetic sensor which is adapted to detect a magnetic metal piece fixed to the rotor or an optical sensor which is adapted to optically detect a hole provided in the rotor. The vehicle speed sensor is not necessarily adapted to sense the rotation speed of the rotor, but may be any mechanism which is adapted to sense the speed or acceleration of the motor vehicle. For example, the vehicle speed sensor may be adapted to sense the rotation speed of a rotary shaft of a power transmission apparatus of the vehicle. If the vehicle includes such a mechanism that a vehicle speed signal can be obtained for an ABS control or the like, the mechanism may be used as the vehicle speed sensor.

The electric motor M is driven by a driving circuit 29. The driving circuit 29 is controlled by an electronic control unit ECU. The electronic control unit ECU includes a microprocessor having a CPU, a ROM and a RAM.

Figure 2:
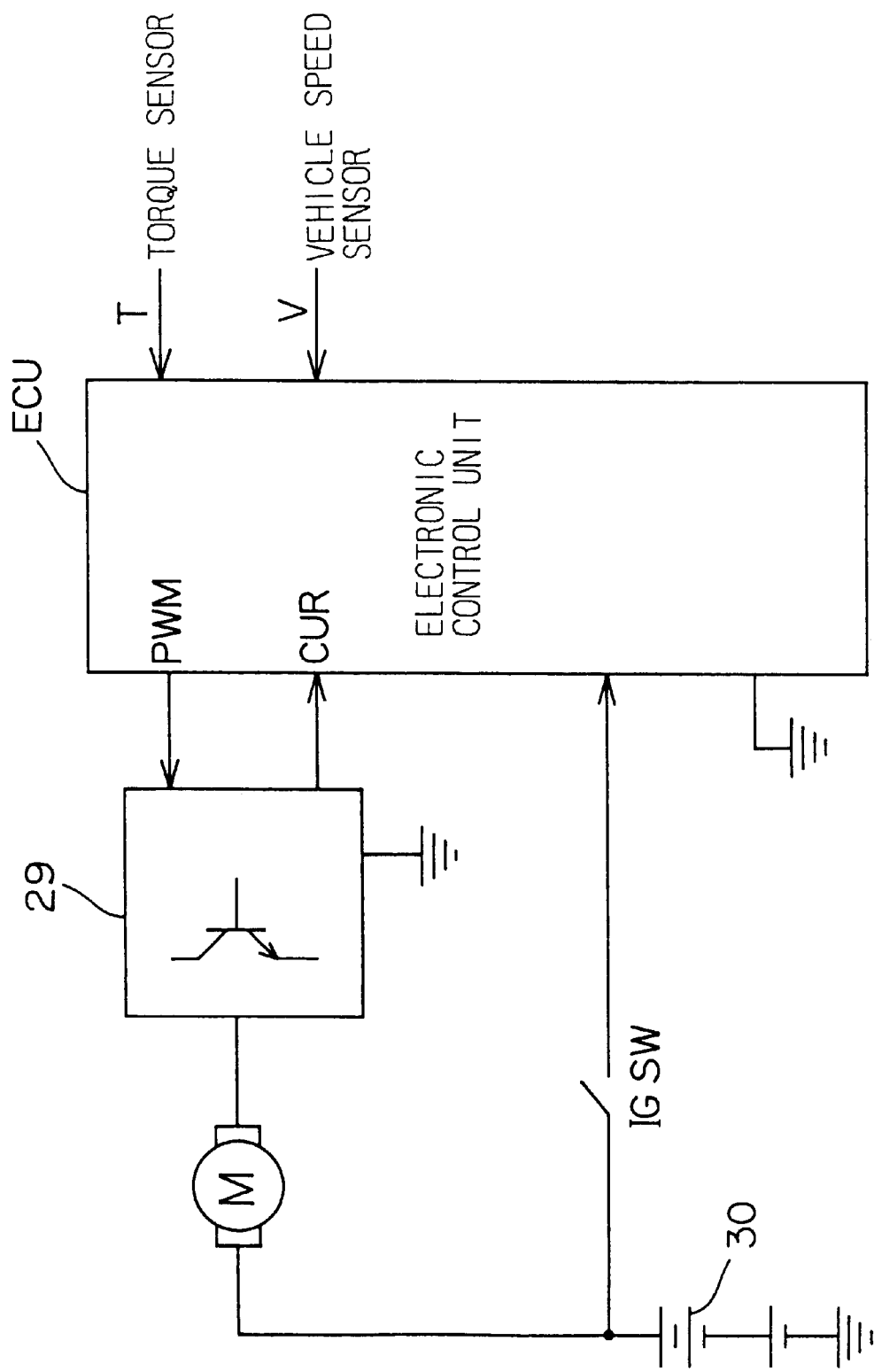

FIG. 2 is a diagram illustrating electrical interconnection of the electronic control unit ECU and the like. A torque signal T and a vehicle speed signal V are applied to the electronic control unit ECU from the torque sensor 27 and the vehicle speed sensor 28, respectively. A power is supplied to the electric motor M from a battery 30 of the vehicle via the driving circuit 29. The driving circuit 29 generates a driving signal pulse-width-modulated at a duty ratio instructed by the electronic control unit ECU. A motor electric current flowing through the driving circuit 29 is sensed and inputted to the electronic control unit ECU.

The electronic control unit ECU controls the driving circuit 29 on the basis of the torque signal applied from the torque sensor 27 and an acceleration signal which is obtained by differentiating the vehicle speed signal V applied from the vehicle speed sensor 28.

Figure 3:
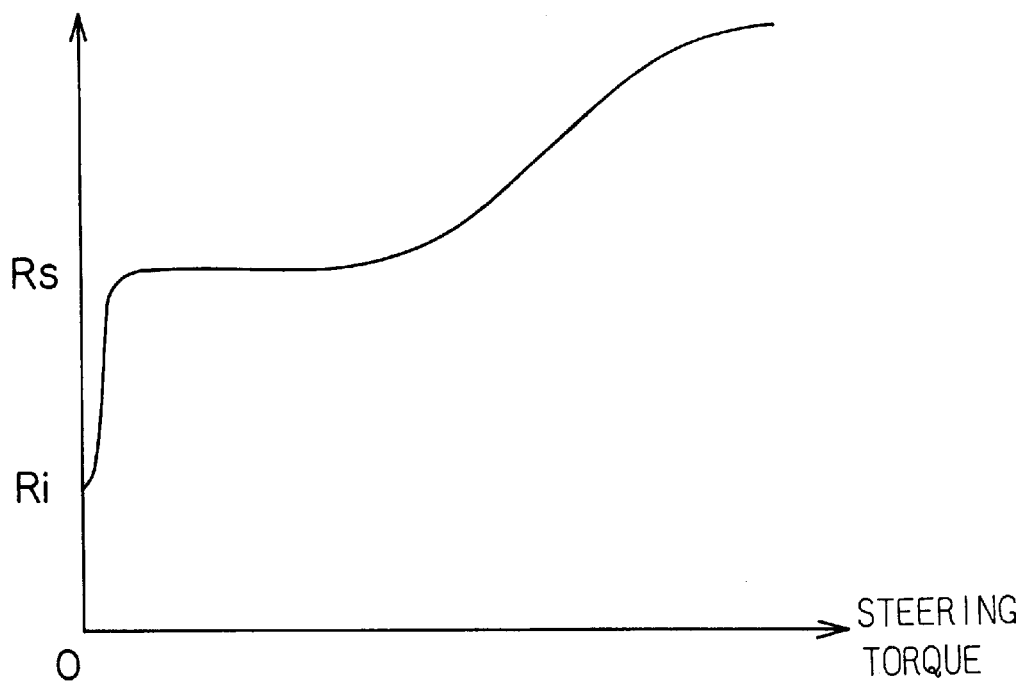
FIG. 3 is a graph showing a control operation to be performed by the electronic control unit ECU for controlling the rotation speed of an electric motor with respect to a change in a steering operation.

FIG. 3 is a graph showing a control operation to be performed by the electronic control unit ECU for controlling the rotation speed of the electric motor with respect to a change in the steering operation. As shown, the rotation speed of the electric motor is set at a stand-by rotation speed Ri when the steering operation is not performed, and increased to an assist rotation speed Rs when the steering operation is started. Thus, an assist force is generated to assist the steering operation performed by a driver.

Figure 4:
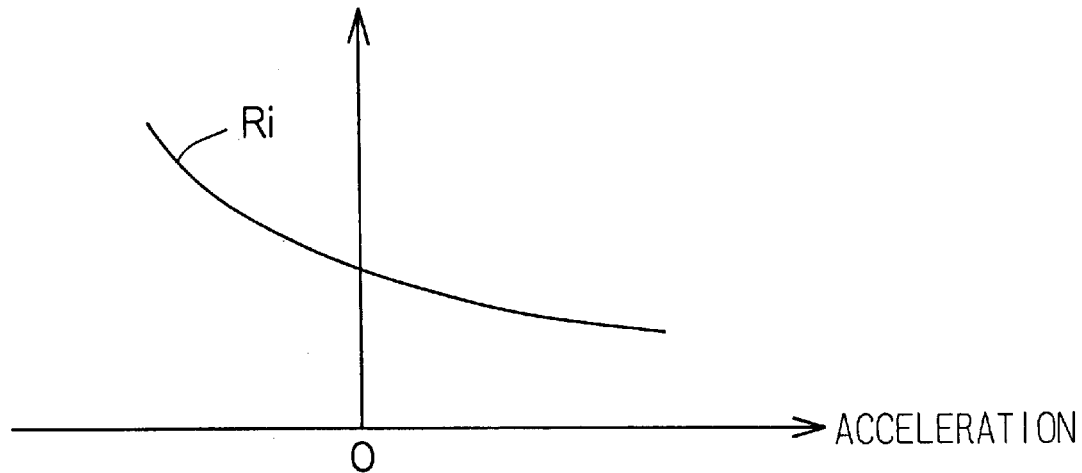
FIG. 4 is a graph for explaining a control operation to be performed to change a stand-by rotation speed Ri when an acceleration is detected in a non-steering state or in a steering state.

In this embodiment, when the acceleration is detected in a non-steering or in a steering state, the electronic control unit ECU varies the stand-by rotation speed Ri as shown in FIG. 4. More specifically, the stand-by rotation speed Ri is reduced if the acceleration is applied in a positive direction, and increased if the acceleration is applied in a negative direction.

Although the stand-by rotation speed Ri is smoothly varied with the change in the acceleration as shown in the graph of FIG. 4, the electronic control unit ECU is adapted to vary the stand-by rotation speed Ri stepwise on the basis of a preliminarily stored table indicative of a relationship between the stand-by rotation speed Ri and the acceleration.

In the power steering apparatus according to the embodiment described above, the acceleration of the vehicle is detected, and the stand-by rotation speed Ri is reduced if the acceleration is applied in the positive direction, and increased if the acceleration is applied in the negative direction. Thus, variations in the steering feeling with a change in the loads on the front wheels can be corrected, so that the power steering apparatus ensures an excellent steering performance.

The assist rotation speed Rs may also be varied in accordance with the acceleration of the vehicle in the same manner as shown in FIG. 4.

Figure 5:
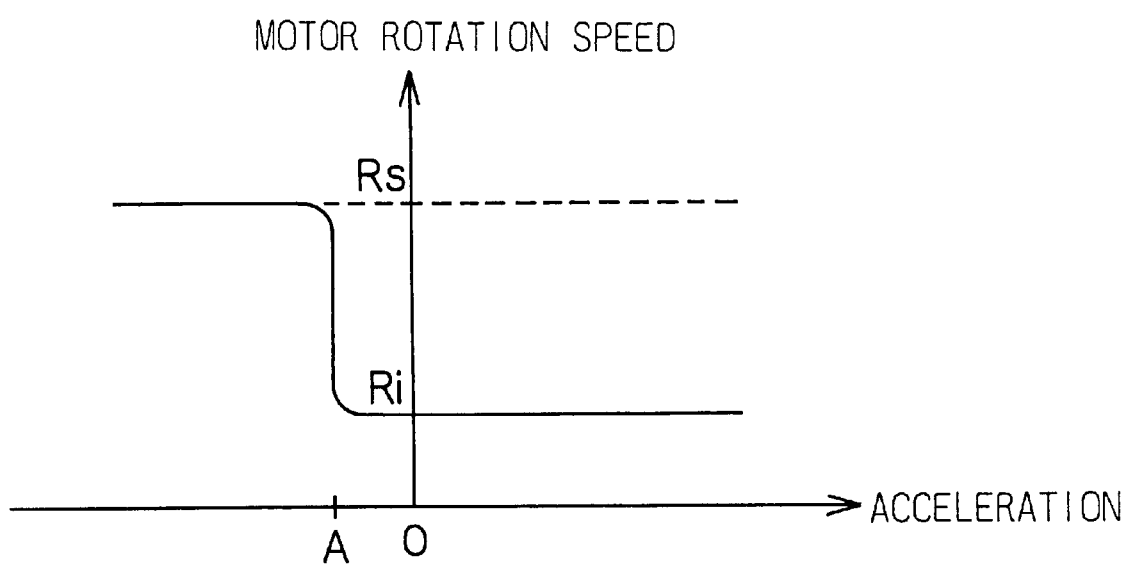
FIG. 5 is a graph for explaining a control operation to be performed to change a motor rotation speed when a predetermined negative acceleration level is detected in the non-steering state.

In accordance with another embodiment, the electronic control unit ECU varies the motor rotation speed as shown in FIG. 5 when a predetermined negative acceleration is detected in the non-steering state. More specifically, if the acceleration is not greater than a predetermined negative level A, the motor rotation speed is increased to the assist rotation speed Rs, whether or not the steering operation is performed.

With this control operation, the rotation speed of the electric motor is increased by predicting presence of a corner in front, so that a sufficient force can quickly be generated to assist the steering operation.

The control operations shown in FIGS. 4 and 5 may be employed either alone or in combination. In the latter case, the power steering apparatus can provide such technical effects that the assist force can quickly be generated before the steering operation at deceleration of the vehicle and that the steering does not feel heavier in the steering operation.

While the embodiments of the present invention have thus been described, it should be understood that the invention be not limited to these embodiments. For example, the acceleration of the vehicle is determined by differentiating the vehicle speed signal applied from the vehicle sensor in the aforesaid embodiments, but may be sensed directly by an acceleration sensor. A known acceleration sensor such as servo-type acceleration sensor or a piezoelectric-type acceleration sensor is usable as the acceleration sensor. Although the stand-by rotation speed Ri of the electric motor is set at a constant value which is not equal to zero in the embodiment shown in FIG. 5, the present invention is applicable to a case where the stand-by rotation Ri is set at zero or the electric motor is controlled to be stopped in the non-steering state. Besides, various modifications may be made within the scope of the present invention.

What is claimed is:

1. A power steering apparatus for assisting a steering operation by a hydraulic pressure generated by driving an oil pump by an electric motor, the apparatus comprising:

acceleration detection means for sensing a fore-and-aft acceleration of a motor vehicle which is expressed as a value prefixed with a sign; and control means for preliminarily setting a rotation speed of the electric motor at a level sufficient for generation of a constant assist force if the value of the acceleration of the vehicle sensed by the acceleration detection means is not greater than a predetermined negative level when a steering operation is not performed.

* * * * *